United States Patent
Haag et al.

(10) Patent No.: US 9,297,717 B2
(45) Date of Patent: Mar. 29, 2016

(54) VENTING SYSTEM, IN PARTICULAR FOR A FUEL TANK

(75) Inventors: Silke Haag, Ilsfeld-Auenstein (DE); Helmut Denz, Stuttgart (DE); Andreas Pape, Oberriexingen (DE); Manfred Franz, Ditzingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 449 days.

(21) Appl. No.: 13/992,895

(22) PCT Filed: Nov. 25, 2011

(86) PCT No.: PCT/EP2011/071010
§ 371 (c)(1),
(2), (4) Date: Aug. 16, 2013

(87) PCT Pub. No.: WO2012/089432
PCT Pub. Date: Jul. 5, 2012

(65) Prior Publication Data
US 2013/0319378 A1 Dec. 5, 2013

(30) Foreign Application Priority Data
Dec. 28, 2010 (DE) .......................... 10 2010 064 239

(51) Int. Cl.
| F02M 37/04 | (2006.01) |
| F02M 25/07 | (2006.01) |
| G01M 3/04 | (2006.01) |
| B60K 15/035 | (2006.01) |
| F02M 25/08 | (2006.01) |

(52) U.S. Cl.
CPC ........... *G01M 3/04* (2013.01); *B60K 15/03504* (2013.01); *F02M 25/089* (2013.01); *F02M 25/0818* (2013.01); *B60K 2015/03514* (2013.01); *F02M 25/0836* (2013.01); *F02M 25/0872* (2013.01)

(58) Field of Classification Search
CPC ..... F02M 25/07; F02M 37/04; F02M 25/089; F02M 25/08; F02M 25/0818; F02M 25/0836; F02M 25/0872; G01M 3/04; B60K 2015/03514
See application file for complete search history.

(56) References Cited

U.S. PATENT DOCUMENTS

| 5,881,700 A | 3/1999 | Gras et al. | |
| 5,983,870 A * | 11/1999 | Bohl | F02M 25/0854 |
| | | | 123/198 D |

FOREIGN PATENT DOCUMENTS

| CA | 2272626 A1 | 1/2000 |
| CN | 1512052 A1 | 7/2004 |
| CN | 1526938 A1 | 9/2004 |
| CN | 1576563 | 2/2005 |
| DE | 196 39 116 | 3/1998 |

(Continued)

*Primary Examiner* — Hieu T Vo
(74) *Attorney, Agent, or Firm* — Kenyon & Kenyon LLP

(57) ABSTRACT

In a venting system, in particular for a fuel tank of a motor vehicle, which has a sorption filter for temporarily storing fuel evaporating from the fuel tank and a fluid-conveying conveying device situated between the sorption filter and an air supply or an intake manifold of an internal combustion engine, according to the present system, the conveying device is a bidirectional conveying device which is switchable in a first conveying direction in the direction of the internal combustion engine for regenerating the sorption filter and in a second conveying direction in the direction of the sorption filter for carrying out a fuel tank leak diagnosis.

16 Claims, 5 Drawing Sheets

(56) References Cited

FOREIGN PATENT DOCUMENTS

| | | |
|---|---|---|
| DE | 196 50 517 | 6/1998 |
| DE | 197 35 549 | 2/1999 |
| DE | 198 29 423 | 1/2000 |
| DE | 198 31 188 | 1/2000 |
| DE | 101 54 360 | 5/2002 |
| DE | 102011086955 A1 * | 2/2013 ......... F02M 35/1038 |
| EP | 0 864 741 | 9/1998 |
| EP | 0 969 198 | 1/2000 |

* cited by examiner

VENTING SYSTEM, IN PARTICULAR FOR A FUEL TANK

FIELD OF THE INVENTION

The present invention relates to a venting system, in particular for a fuel tank of a motor vehicle, which has a sorption filter for temporarily storing fuel evaporating from the fuel tank and a fluid-conducting conveying device which is situated between the sorption filter and an intake manifold of an internal combustion engine. The present invention furthermore relates to a method for carrying out a fuel tank leak diagnosis as well as a motor vehicle having a venting system.

BACKGROUND INFORMATION

Volatile substances, such as essentially hydrocarbons, and to a lesser extent other volatile components evaporate in a fuel tank of a motor vehicle as a function of the pressure and temperature conditions prevailing in the fuel tank as well as a composition of the fuel. For reasons of environmental protection and safety, these substances must be captured and supplied to the engine for combustion. For this purpose, the volatile substances are generally adsorbed and temporarily stored with the aid of an active carbon filter. To regenerate or desorb the active carbon filter, the substances are extracted with the aid of a fluid flow—generally fresh air—and supplied to an intake manifold provided upstream from the internal combustion engine for combustion. The extraction takes place with the aid of underpressure, which sets in the intake manifold as a result of throttling of the engine.

In turbo engines, hybrid vehicles and engines in which the engine may be operated in dethrottling mode to reduce fuel consumption, the problem generally arises that a conventional fuel tank ventilation using underpressure in the intake manifold does not adequately regenerate the active carbon filter.

In addition, the laws of some countries require the operability of fuel tank venting systems in motor vehicles to be tested with the aid of on-board means, i.e., using a so-called on-board diagnosis (OBD). During the on-board diagnosis, any leaks which occur must be detected, signaled and corresponding data provided to an on-board memory for off-board diagnosis to be carried out in a repair shop.

A treatment system for evaporating fuel is discussed in DE 101 54 360 A1 which has a purge channel for providing a connection between an intake manifold of an internal combustion engine and a fuel tank. In an intermediate part of the purge channel, a canister is provided for temporarily adsorbing evaporated fuel which is produced in the fuel tank. A purge pump is furthermore provided in one section of the purge channel, the purge pump being configured to transport evaporated fuel from the canister to the intake manifold. After an atmospheric air inlet valve of the canister closes, the operation of the purge pump is interrupted when the underpressure in the fuel tank has reached a predetermined value as a result of the operation of the purge pump. After the purge pump stops, a flow control valve is closed, which is provided on the intake manifold or in its vicinity. If a change in the pressure in the fuel tank is detected after a predetermined period of time has elapsed, the entire purge channel is checked in reference to an error.

A device for diagnosing a fuel tank venting system of a vehicle is furthermore discussed in DE 197 35 549 A1, which includes a fuel tank and an adsorption filter which is connected to the fuel tank via a fuel tank connecting line. For venting, the fuel tank venting system has a fuel tank venting valve which is connected to the adsorption filter via a valve line. A switching means alternately applies a pressure to the fuel tank venting system and a reference leak with the aid of an on-board pressure source and ascertains a possible leak in this way.

SUMMARY OF THE INVENTION

An object of the exemplary embodiments and/or exemplary methods of the present invention is to provide a venting system for a fuel tank which is cost-effective to manufacture, permits good regeneration or desorption of the sorption filter, on the one hand, and ensures an on-board diagnosis of a possible leak in the fuel tank venting system, on the other hand.

According to the exemplary embodiments and/or exemplary methods of the present invention, a venting system, in particular for a fuel tank of a motor vehicle, is provided which has a sorption filter for temporarily storing fuel evaporating from the fuel tank and a fluid-conducting conveying device which is situated between the sorption filter and an internal combustion engine, in particular between the sorption filter and an air supply upstream from a charging or turbocharger unit of the internal combustion engine or an intake manifold of the internal combustion engine, in which the conveying device is a bidirectional conveying device which is switchable in a first conveying direction in the direction of the internal combustion engine for regenerating the sorption filter and in a second conveying direction in the direction of the sorption filter for carrying out a fuel tank leak diagnosis.

The venting system of a motor vehicle according to the present invention may include a fuel tank which has a fluid-conveying connection to a sorption filter, which may be an active carbon adsorption filter, via a fuel tank connecting line. This sorption filter temporarily stores volatile substances of the fuel, such as volatile hydrocarbons and other components which are released as a result of the pressure and temperature conditions prevailing in the fuel tank, in particular when filling the fuel tank.

The sorption filter has a fluid-conveying connection via a purge line to an intake manifold upstream from an internal combustion engine. According to the exemplary embodiments and/or exemplary methods of the present invention, a bidirectional conveying device is situated in a section of the purge line. The bidirectional conveying device is alternately switchable in a first conveying direction in the direction of the intake manifold or internal combustion engine and in a second conveying direction in the direction of a sorption filter or fuel tank. The bidirectional conveying device is thus configured in such a way that it may convey fluids in opposite directions.

In the present case, fluids are understood to be, in particular, fuels, fuel-air mixtures and gaseous mixtures made of fuel components, such as volatile hydrocarbons, and air.

If the bidirectional conveying device is switched in the conveying direction in the direction of the internal combustion engine, an adequately large suction or fluid flow in the direction of the intake manifold is set, so that the sorption filter, which is temporarily enriched with evaporated fuel, is regenerated, i.e., essentially completely desorbed, with the aid of a supplied purging fluid. The sorption filter is "purged" with the aid of the fluid, which may be, for example, externally supplied fresh air.

However, if the bidirectional conveying device is switched in the conveying direction in the direction of the sorption filter while the engine is stopped, an overpressure may be built up in the area between the bidirectional conveying device and the fuel tank. A fuel tank leak diagnosis—an on-board diagnosis—may be carried out on the basis of ascertained pressure values.

The venting system according to the present invention, on the one hand, ensures a good regeneration of the sorption filter and, on the other hand, enables an on-board fuel tank leak diagnosis required in some countries to be easily carried out, without additional components having to be installed in the venting system for this diagnosis.

According to one advantageous refinement of the venting system, the bidirectional conveying device is configured as a bidirectional pump.

In this refinement, a bidirectional pump, also known as a purge pump, is situated in a section of the purge line. The bidirectional pump is alternately switchable in a first conveying direction in the direction of the intake manifold or internal combustion engine and in a second conveying direction in the direction of a sorption filter or fuel tank. The bidirectional pump is therefore configured in such a way that it may convey the fluids in opposite directions.

If the bidirectional pump is switched in the conveying direction in the direction of the internal combustion engine, an adequately large suction or fluid flow in the direction of the intake manifold is set, so that the sorption filter, which is temporarily enriched with evaporated fuel, is regenerated, i.e., essentially completely desorbed, with the aid of a supplied purging fluid. The sorption filter is "purged" with the aid of the fluid, which may be, for example, externally supplied fresh air.

However, if the bidirectional pump is switched in the conveying direction in the direction of the sorption filter while the engine is stopped, an overpressure may be built up in the area between the bidirectional pump and the fuel tank. A fuel tank leak diagnosis—an on-board diagnosis—may be carried out on the basis of ascertained pressure values.

On the one hand, a good regeneration of the sorption filter is ensured and, on the other hand, an on-board fuel tank leak diagnosis required in some countries may be easily carried out without additional components having to be installed in the venting system for this diagnosis.

According to one advantageous refinement of the venting system, a fuel tank venting valve is situated between the bidirectional pump and the intake manifold.

The fuel tank venting valve is suitable for either releasing or closing the fluid-conveying connection between the bidirectional pump and the intake manifold for purging or regenerating the sorption filter. If the fuel tank venting valve is closed, the regeneration of the sorption filter is interrupted, and the fuel evaporating in the fuel tank is supplied to the filter via the fuel tank connecting line, where it is adsorbed and temporarily stored until the next purging operation.

According to another advantageous refinement of the venting system, the internal combustion engine is a turbo engine having a turbocharger unit.

The venting system according to the present invention is suitable, in particular, for use in turbo engines, which may be in downsized turbo engines which ensure an engine power in smaller and lighter-weight engines that is comparable to conventional engines having a larger engine displacement. With the aid of the bidirectional pump, the problem is overcome that turbo engines generate a relatively low intake underpressure via the intake manifold, due to a dethrottled operating mode, the intake underpressure often not being sufficiently high to completely regenerate the sorption filter.

For this purpose, the pump has a fluid-conveying connection to the intake manifold at an induction point upstream from the turbocharger unit via a first line and at an induction point downstream from the throttle valve via a second line.

In a refinement of this type, the venting system has two induction points via which the evaporated fuel desorbed from the sorption filer may be supplied to the engine. If the pressure prevailing in the purge line is higher than the pressure in the intake manifold, i.e., if the engine is operated in throttled mode with intake manifold underpressure, the regeneration takes place in the intake manifold while the pump is switched off. However, if the engine is in the turbocharging range, i.e., if it is being operated with overpressure in the intake manifold, the pump is switched on, and the purging fluid which has been enriched with volatile fuel components is supplied to the engine via the induction point upstream from the turbocharger unit. The bidirectional pump may thus work under a lower pump power, since the pressure at this induction point is equal to the ambient pressure and is thus lower in charging mode than it is at the induction point downstream from the throttle valve. It is thus possible to switch on the pump in charging mode only if a high loading of the active carbon filter has taken place.

In this advantageous configuration of the venting system, the first and second lines are each provided with a check valve.

Both valves open in the direction of flow toward the engine at what may be low differential pressure.

The check valve in the first line prevents air from being sucked into the intake manifold from the induction point upstream from the turbocharger in suction mode. The check valve in the second line prevents an air flow from the intake manifold upstream from the turbocharger during charging mode with intake manifold overpressure.

To enable the bidirectional pump to pump in the second conveying direction in the direction of the sorption filter for carrying out a fuel tank leak diagnosis despite the check valves when the engine is stopped, a switchover valve is situated between the pump and the intake manifold for supplying fresh air during the fuel tank leak diagnosis.

The switchover valve may be configured as a 2/3-way valve. If the bidirectional pump is switched in the first conveying direction in the direction of the internal combustion engine for regenerating the sorption filter, the fresh air supply of the switchover valve is blocked, and the purge line is opened to convey fluid in the direction of the intake manifold. However, if the bidirectional pump is switched in the second conveying direction in the direction of the sorption filter for carrying out a fuel tank leak diagnosis, the fresh air supply of the switchover valve is opened, and the purge line is blocked on the intake manifold side. In this way, an overpressure is generated in the venting system in the section between the switchover valve and the fuel tank with the aid of the fresh air supply, which makes it possible to ascertain a possible leak.

According to another advantageous refinement of the venting system, the switchover valve is integrated into the bidirectional pump.

In a refinement of this type, the bidirectional pump and the switchover valve are provided as one assembly. The assembly may be integrated into the venting system in an easy, space-saving and cost-effective way.

According to yet another advantageous refinement of the venting system, the switchover valve is integrated into a fuel tank venting valve, whereby the valve may also be integrated into the venting system in an easy, space-saving and cost-effective way.

According to one advantageous refinement of the venting system, the sorption filter has a fluid-conveying connection to the intake manifold via the tank venting valve and a first line via the pump at a first induction point upstream from the throttle valve and, likewise, via the tank venting valve and a second line at a second induction point downstream from the throttle valve, and the bidirectional conveying device is situated in the first line.

A refinement of this type is used, in particular, in induction engines. In the present case, the venting system has two induction points via which the evaporated fuel desorbed from the sorption filter may be supplied to the engine. The bidirectional conveying device may thus convey in the direction of the intake manifold and in the direction of the sorption filter, despite a prevailing intake manifold underpressure when the throttle valve is partially or fully closed.

A tank leak diagnosis, namely a rough leak test, may be carried out, for example, even when the engine is running while being operated under intake manifold underpressure. A regeneration of the sorption filter may furthermore take place only via the tank venting valve without a pressure drop over the pump during engine operation under intake manifold underpressure.

According to another advantageous refinement of the venting system, the first induction point is an induction point upstream from a turbocharger unit, and the second induction point is an induction point downstream from the throttle valve.

In the present case, the internal combustion engine is configured as a turbo engine having a turbocharger unit. The bidirectional conveying device is connected in the first line, which empties into the air supply at a point which is upstream from the turbocharger unit.

Due to the described configuration, the flow resistance is reduced during regeneration in the intake manifold underpressure mode in both induction engines and turbo engines, which increases the regeneration rate of the sorption filter even without a pump. A demand-oriented regeneration rate increase is further improved. The power consumption of the pump is furthermore minimized.

According to another advantageous design of the venting system, the bidirectional conveying device includes a unidirectional pump which has a first switchover valve situated at the pump outlet and a second switchover valve situated at the pump inlet.

According to this refinement, the bidirectional conveying device does not include a bidirectional pump but a unidirectional pump, i.e., a pump which is configured to operate in only one direction, namely without reversing the flow.

A unidirectional pump of this type has a simple structure and is cost-effective to manufacture.

In the present case, a reversal of the direction of flow is achieved with the aid of two simultaneously activated switchover valves which may be configured as 2/3-way valves. A first switchover valve is situated at the pump outlet and a second switchover valve is situated at the pump inlet.

Moreover, in the switched-over position, the first switchover valve may advantageously have a fluid-conveying connection to the sorption filter and the second switchover valve may have a fluid-conveying connection to a point downstream from the first switchover valve.

The bidirectional conveying device, i.e., the so-called regeneration and diagnosis module, therefore has three pneumatic connections in the present case.

To regenerate the sorption filter, the first and second switchover valves are switched to a first position which releases the first line. The fluid-conveying connection between the first switchover valve and the sorption filter and the fluid-conveying connection between the second switchover valve and the first line are interrupted.

On the one hand, regeneration may take place via the first line with the aid of a Venturi effect during charging mode of the engine, even if the unidirectional pump is switched off. If the sorption filter is under high load, the unidirectional pump may be switched on. The regeneration rate of the sorption filter may be controlled with the aid of a cycling behavior of a tank venting valve. However, regeneration may also take place via the second line even when operating under intake manifold underpressure without an additional flow resistance of the pump.

To carry out a tank leak diagnosis, the first and second switchover valves are activated simultaneously. Thus, a combination valve may be used which is activated via only one output stage of the engine control unit. The first and second switchover valves are switched to a second position, in which the first line is closed between the pump inlet and the tank venting valve or the sorption filter as well as between the pump outlet and the intake manifold. Conversely, the fluid-conveying connection between the first switchover valve and the sorption filter and the fluid-conveying connection between the second switchover valve and the first line are instead released. In other words, the first line from the induction point upstream from the turbocharger unit in the turbo engine or upstream from the throttle valve in the induction engine is switched on the intake side in the direction of the unidirectional pump and its pump outlet, i.e., its pressure output, in the direction of the sorption filter.

In the event of a closed tank venting valve and a closed sorption filter venting valve, an overpressure may be built up in the tank venting system by switching on the unidirectional pump. For example, a rough leak diagnosis may be carried out if the engine is running, and a fine leak diagnosis may be carried out if the engine is stopped, by evaluating pressure curves. The pressure curves may be ascertained with the aid of a tank pressure sensor.

For the fine leak diagnosis, the unidirectional pump is switched off and the two switchover valves are switched to the idle position once a defined overpressure has been reached and the tank venting valve remains closed. It is ascertained whether the defined overpressure is maintained. If the pressure is maintained, no leak has occurred.

According to one advantageous refinement of the venting system, instead of a pressure sensor in the fuel tank at the point between the tank venting valve and the sorption filter and a point between the second switchover valve and the unidirectional pump, a differential pressure sensor is provided.

The use of a differential pressure sensor makes it possible to detect and precisely determine the regenerating gas flow during regeneration of the sorption filter, i.e., positive and negative pressures. In regeneration mode, in which the second switchover valve is in the idle position, the regenerating gas flow may be calculated from an ascertained differential pressure and a pulse duty factor of the tank venting valve, when the unidirectional pump is switched off or on.

Ambient pressure approximately prevails at the connection between the second switchover valve and the unidirectional pump, so that the overpressure which builds up when the unidirectional pump is switched on and the tank venting valve and sorption filter venting valve are blocked is measurable via the second connection of the differential pressure sensor between the tank venting valve and the sorption filter. During the fine leak diagnosis—which may be when the engine is turned off—an ambient pressure between the sorption filter and the tank venting valve sets in relatively quickly after the pressure buildup and subsequent deactivation of the unidirectional pump, so that a precise tank pressure curve may be ascertained in the closed system via the connection between the pump and the second switchover valve, and a possible leak may be inferred, if necessary.

Another object of the exemplary embodiments and/or exemplary methods of the present invention is a method for carrying out a fuel tank leak diagnosis. The method includes the following steps:

provide a sorption filter, an intake manifold and a line having a bidirectional conveying device which has a fluid-conveying connection to the sorption filter and the intake manifold;

generating a fluid flow in the line in the direction of the sorption filter, with the aid of the bidirectional conveying device;

generating an overpressure with the aid of the fluid flow; and diagnosing a possible leak on the basis of the overpressure.

According to the exemplary embodiments and/or exemplary methods of the present invention, a sorption filter for sorbing and temporarily storing volatile fuel components has a fluid-conveying connection to a fuel tank via a fuel tank connecting line. This sorption filter has a fluid-conveying connection via a line to an intake manifold of an internal combustion engine or additionally to an induction point upstream from a turbocharger in a turbo engine. A bidirectional conveying device, which generates a fluid flow in the direction of the sorption filter, is provided in this line. With the aid of the fluid flow, an overpressure is thus generated in a section between the bidirectional conveying device and the fuel tank, when the tank venting valve and sorption filter venting valve are closed, making it possible to diagnose a possible leak. This method provides a high selectivity for distinguishing between different leak sizes.

A motor vehicle having a venting system according to the present invention is furthermore provided.

The motor vehicle according to the present invention is advantageously equipped with a venting system according to the features explained above. A venting system of this type ensures that an adequately good regeneration of the sorption filter is provided, on the one hand. On the other hand, an on-board fuel tank leak diagnosis may always be carried out easily and cost-effectively.

Exemplary embodiments of the approach according to the present invention are explained in greater detail below on the basis of the attached drawings.

DETAILED DESCRIPTION

Figure 1:
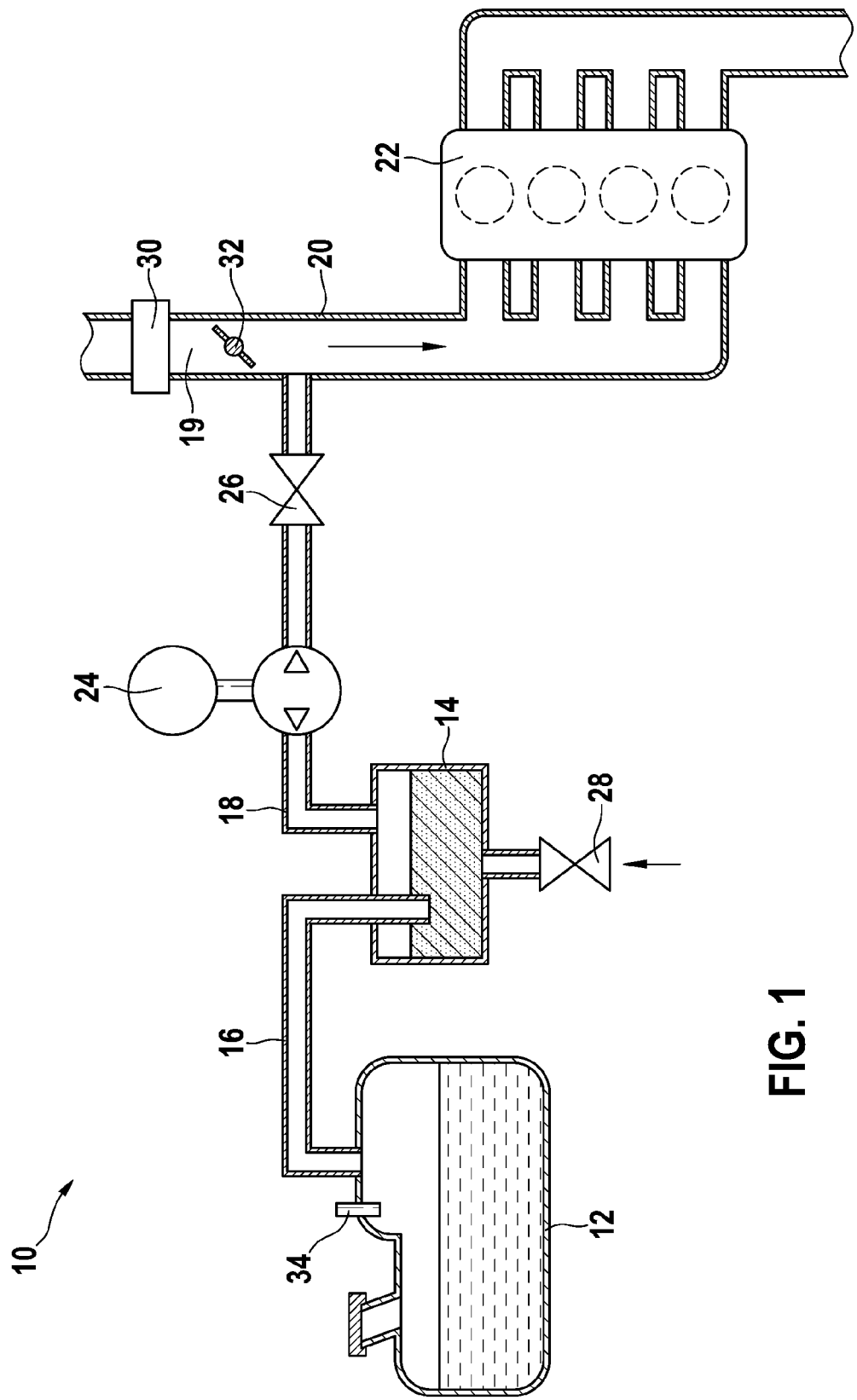
FIG. 1 shows a schematic representation of a first exemplary embodiment of a venting system according to the present invention.

FIG. 1 illustrates a venting system 10 of a fuel tank 12. Venting system 10 has a sorption filter 14 for temporarily accommodating fuel evaporating from fuel tank 12. Sorption filter 14 has a fluid-conveying connection via a purge line 18 to fuel tank 12 via a fuel tank connecting line 16, on the one hand, and to an intake manifold 20 of an engine, in the present case an internal combustion engine 22, via an air supply 19, on the other hand. Volatile components of the fuel may thus be conveyed via fuel tank connecting line 16 from fuel tank 12 to sorption filter 14, and from there they may be supplied via purge line 18 to internal combustion engine 22 for combustion.

When fuel tank 12 is filled with fuel, or if certain pressure and temperature conditions prevail in fuel tank 12 under which volatile components of the fuel, such as hydrocarbons, are converted into the gaseous phase, these volatile components are supplied via fuel tank connecting line 16 to sorption filter 14, where they are temporarily stored. Sorption filter 14 is configured as an active carbon filter 14 which may adsorb and resorb the volatile components.

In purge line 18, a bidirectional pump 24 is connected between sorption filter 14 and intake manifold 20, and a fuel tank venting valve 26 is connected between this pump 24 and intake manifold 20. Sorption filter 14 is furthermore assigned a venting valve 28 which, in the open state, provides fresh air—so-called purging fluid—with the aid of which the volatile fuel components adsorbed in the filter may be desorbed again.

Bidirectional pump 24 is alternately switchable in a first conveying direction in the direction of internal combustion engine 22 or intake manifold 20 and in a second conveying direction in the direction of sorption filter 14 or fuel tank 12, with the aid of a control unit, which is not shown. In the first case, sorption filter 14, which has been enriched with evaporated fuel, is regenerated, i.e., desorbed. In the second case, a fuel tank leak diagnosis of venting system 10 is carried out.

During regeneration of sorption filter 14, fuel tank venting valve 26 and venting valve 28 of filter 14 are opened, and pump 24 sucks in fresh air from the atmosphere via venting valve 28 through sorption filter 14, which has been enriched with evaporated fuel, into purge line 18. The air flowing through filter 14 desorbs the fuel enriched therein. The purging fluid, which is essentially enriched with hydrocarbons, is admixed with a fuel/air mixture in intake manifold 20 for combustion, at an induction point which is downstream from an air mass sensor 30 and a throttle valve 32. The pump is switched on only if no adequate intake manifold underpressure is present. If sufficient underpressure is present, the regeneration takes place when pump 24 is stopped due to its leakage.

A desorption of sorption filter 14 via the pump may take place when internal combustion engine 22 must generate high power and an adequate intake manifold underpressure is not present, for example during longer uphill travel, i.e., while the throttle valve is opened. A demand-oriented regeneration of sorption filter 14 is thus made possible, whereby the power consumption of the pump motor may be minimized. Existing vehicle hardware may be furthermore retained unchanged when using venting system 10.

To carry out an on-board fuel tank leak diagnosis, bidirectional pump 24 transports a fluid, in particular fresh air which is to be supplied from the outside via the intake line of internal combustion engine 22 and tank venting valve 26, in the direction of fuel tank 12, while internal combustion engine 22 is stopped. An overpressure is generated in venting system 10, i.e., in all areas between pump 24 and fuel tank 12, when venting valve 28 is closed. Tank venting valve 26 is then closed, and a pressure sensor 34 situated in fuel tank 12 ascertains the pressure over a certain period of time. This makes it possible to infer a possible leak in venting system 10.

Figure 2:
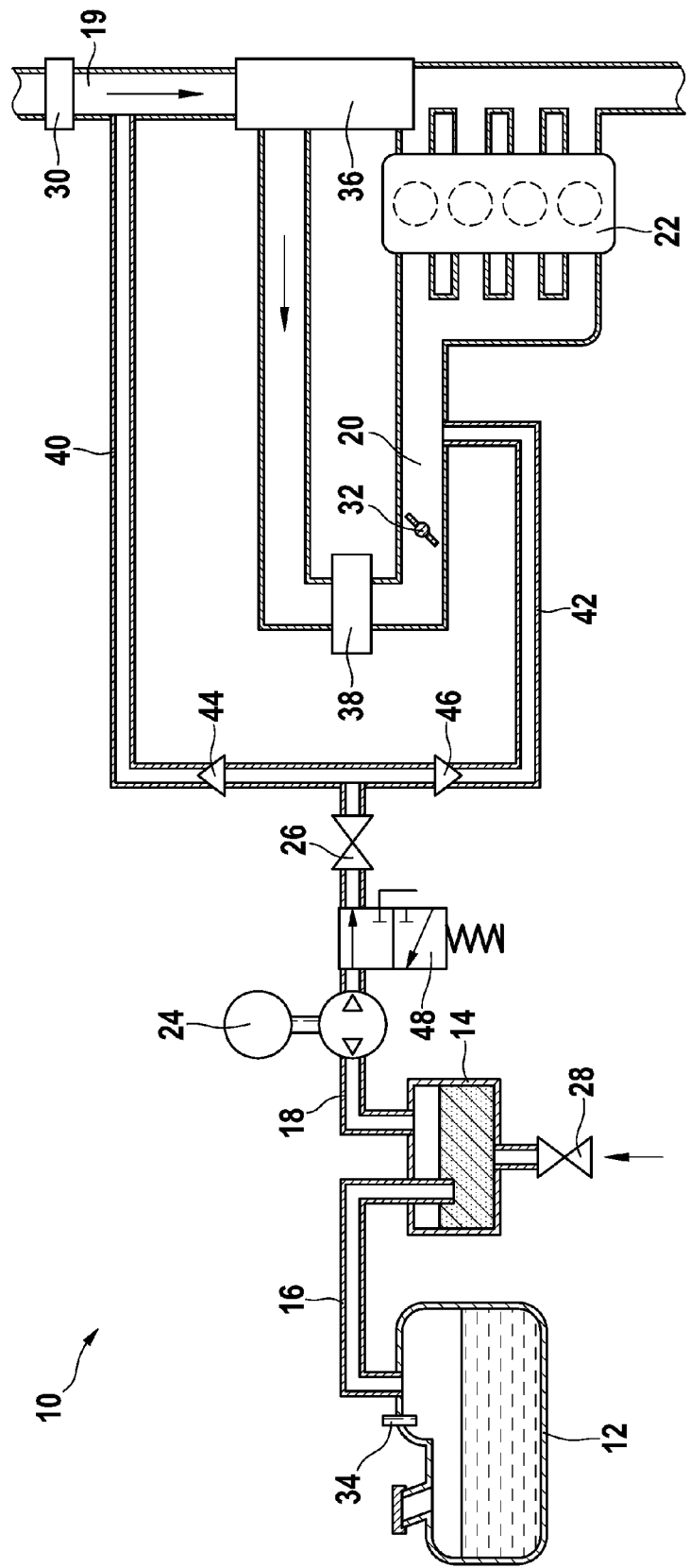
FIG. 2 shows a schematic representation of a second exemplary embodiment of a venting system according to the present invention.
Figure 3:
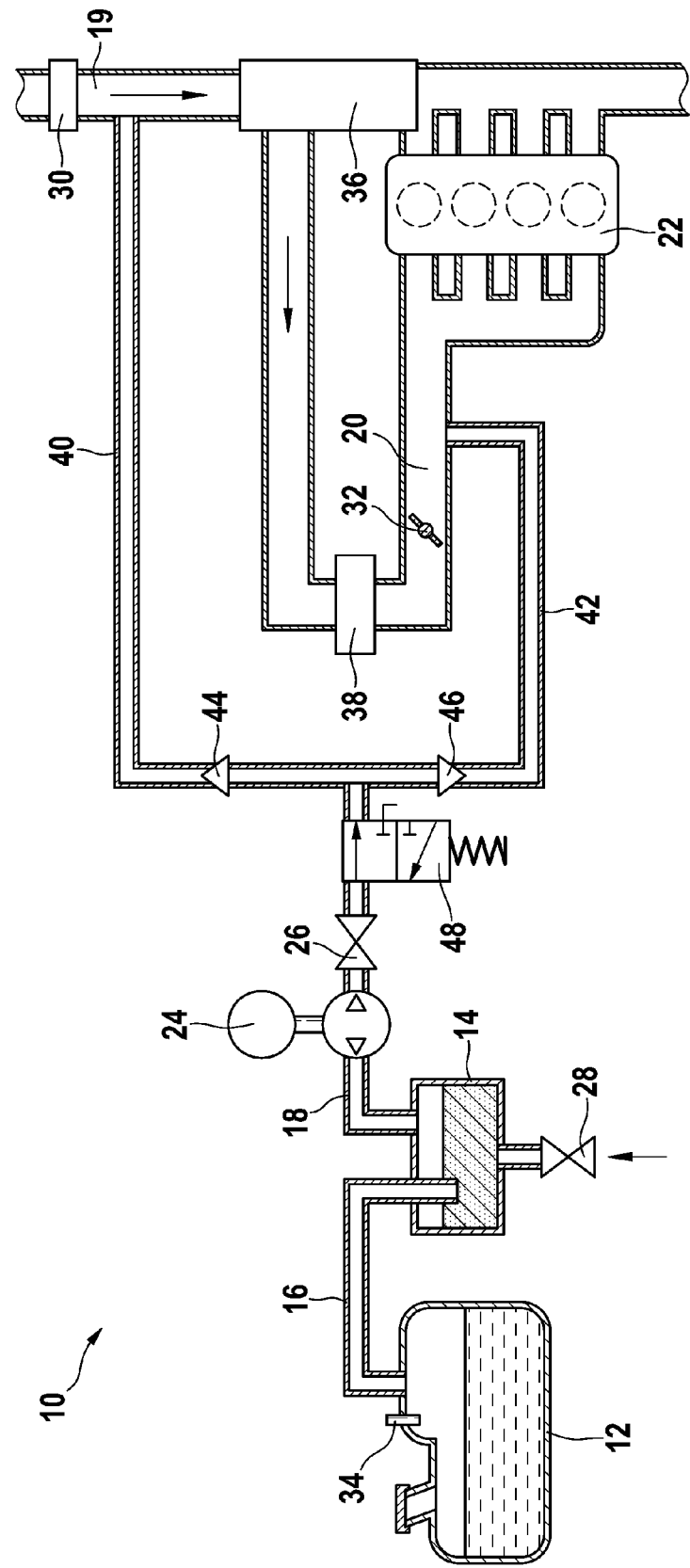
FIG. 3 shows a schematic representation of a third exemplary embodiment of a venting system according to the present invention.

FIGS. 2 and 3 show a venting system 10 according to FIG. 1, which is assigned to an internal combustion engine 22 in the form of a turbo engine. Air supply 19, which is connected upstream from engine 22, has a turbocharger unit 36 as well as a charge air cooler 38 between air mass sensor 30 and throttle valve 32.

Bidirectional pump 24 has a fluid-conveying connection to intake manifold 20 at an induction point upstream from turbocharger unit 36 via a first line 40 and at an induction point downstream from throttle valve 32 via a second line 42. A first check valve 44 is situated in first line 40, and a second check valve 46 is situated in second line 42.

If bidirectional pump 24 is switched in the direction of internal combustion engine 22, venting valve 28 of sorption filter 14 as well as fuel tank venting valve 26 are opened. Fresh air flows through venting valve 28 and sorption filter 14 into purge line 18 in the form of purging air and desorbs the temporarily stored, volatile fuel components. In induction mode of internal combustion engine 22, the fluid flows into intake manifold 20 via second line 42 when pump 24 is switched off. When the engine is operating in the turbocharging range, pump 24 is switched on, and the fluid flows to turbocharger 36 via first line 40.

If bidirectional pump 24 is switched in the direction of sorption filter 14 while the engine is stopped, for the purpose of carrying out a fuel tank leak diagnosis, a switchover valve 48 in the form of a 2/3-way valve is activated, which optionally releases a fresh air supply. Pump 24 may thus suck in fresh air. This air is pumped in the direction of fuel tank 12, and an overpressure is generated while venting valve 28 is closed. Pressure sensor 34 in fuel tank 12 ascertains pressure values over a certain period of time while tank venting valve 26 is closed and thereby detects a possible leak in venting system 10.

In FIG. 2, switchover valve 48 is integrated into bidirectional pump 24, and in FIG. 3 it is integrated into fuel tank venting valve 26.

Conversely, when bidirectional pump 24 is switched in the direction of internal combustion engine 22, switchover valve 48 is switched to a position in which the fresh air supply is interrupted and purge line 18 is released.

Figure 4:
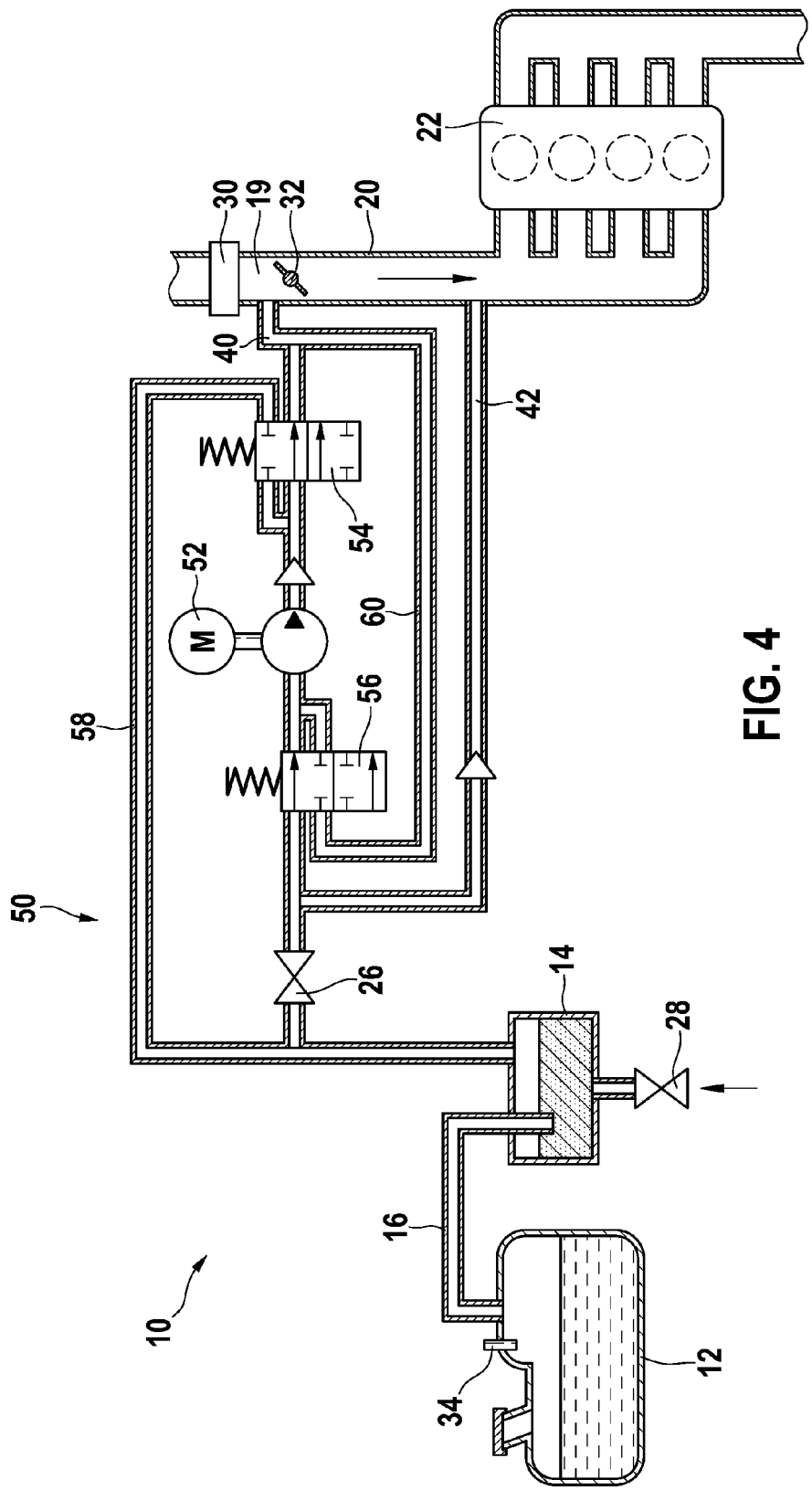
FIG. 4 shows a schematic representation of a fourth exemplary embodiment of a venting system according to the present invention.
Figure 5:
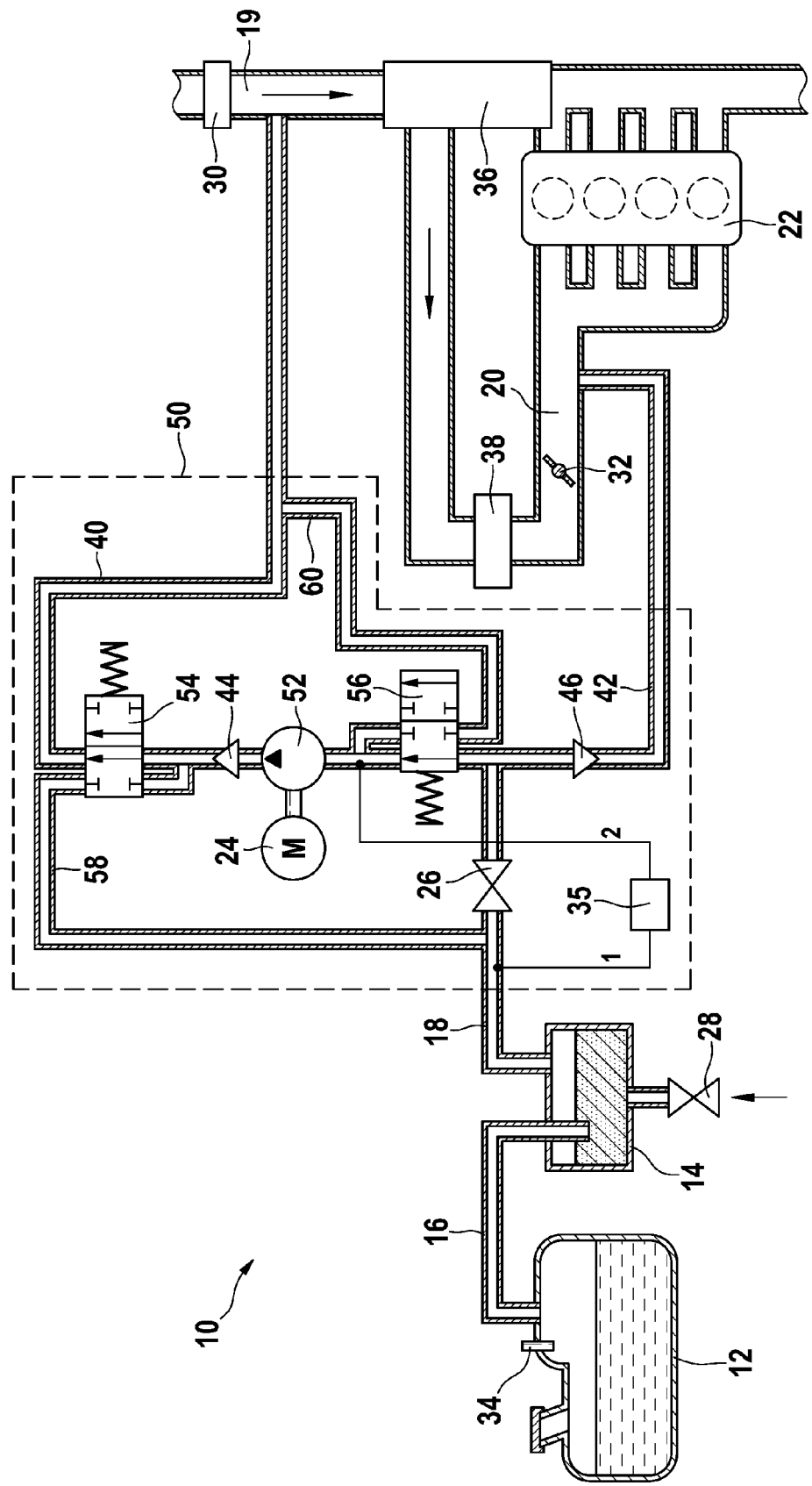
FIG. 5 shows a schematic representation of a fifth exemplary embodiment of a venting system according to the present invention.

FIGS. 4 and 5 show another specific embodiment of venting system 10, compared to FIGS. 1, 2 and 3; venting system 10 according to FIG. 4 is assigned to an induction engine 22, and venting system 10 according to FIG. 5 is assigned to a turbo engine 22.

According to FIG. 4, sorption filter 14 has a fluid-conveying connection to the air supply upstream from the throttle valve via first line 40 and to intake manifold 20 of internal combustion engine 22 via second line 42. In turbo engine 22 according to FIG. 5, conversely, first line 40 empties into a first induction point, which is upstream from turbocharger unit 36, and second line 42 empties into a second induction point, which is downstream from throttle valve 32.

In the present case, venting systems 10 do not include a bidirectional pump 24, but instead a bidirectional conveying device 50 is intermediately connected in first line 40 and is formed with the aid of a unidirectional pump 52 having a first switchover valve 54 situated at the pump outlet and a second switchover valve 56 situated at the pump inlet. The two switchover valves 54, 56 for reversing the conveying direction are configured as 2/3-way valves and are activated simultaneously. Switchover valves 54, 56 are configured as a combination valve which is activated via only one output stage of the engine control unit.

First switchover valve 54 has a fluid-conveying connection to sorption filter 14 via a third line 58, and second switchover valve 56 is connected to first line 40 at a point downstream from first switchover valve 54 via a fourth line 60. As a so-called regeneration and diagnosis module, bidirectional conveying device 50 thus has only three pneumatic connections.

To regenerate sorption filter 14, first and second switchover valves 54, 56 are switched to a first position which releases first line 40. Third line 58 between first switchover valve 54 and sorption filter 14 as well as fourth line 60 between second switchover valve 56 and first line 40 are interrupted.

On the one hand, sorption filter 14 may be regenerated via first line 40 with the aid of a Venturi effect during charging mode of internal combustion engine 22, when unidirectional pump 52 is switched off. Under a high load of sorption filter 14, unidirectional pump 42 is switched on, and the regeneration rate is thereby increased. In induction mode of internal combustion engine 22, on the other hand, regeneration into intake manifold 20 may take place via second line 42 with the aid of intake manifold underpressure without the flow resistance of pump 24. The regeneration rate of sorption filter 14 is controlled with the aid of a cycling behavior of tank venting valve 26.

To carry out a tank leak diagnosis, first and second switchover valves 54, 56 are activated simultaneously. First and second switchover valves 54, 56 are switched to a second position in which first line 40 is closed between the pump inlet and tank venting valve 26 as well as between the pump outlet and intake manifold 20. Third and fourth lines 58, 60, however, are released.

In the event of a closed tank venting valve 26 and a closed venting valve 28, an overpressure may be built up in tank venting system 10 by activating unidirectional pump 52. For example, a rough leak diagnosis may be carried out if internal combustion engine 22 is running, and a fine leak diagnosis may be carried out if engine 22 is stopped, by evaluating pressure curves.

For the fine leak diagnosis, unidirectional pump 52 is switched off and the two switchover valves 54, 56 are switched to the idle position once a defined overpressure has been reached and tank venting valve 26 and venting valve 28 remain closed. As a result, the tank venting system is completed and it is ascertained whether the defined overpressure is maintained and thus no leak has occurred.

According to FIG. 5, a differential pressure sensor 35 for ascertaining differential pressure values according to the features mentioned in the discussion of the claims is connected at a point between sorption filter 14 and tank venting valve 26 as well as at a position between second switchover valve 56 and unidirectional pump 52. If a signal of differential pressure sensor 35 is pulsing significantly due to a clocking of tank venting valve 26, a pneumatic or electrical filter may also be used as needed.

What is claimed is:

1. A venting system for a fuel tank of a motor vehicle, comprising:
   a sorption filter for temporarily storing fuel evaporating from the fuel tank; and
   a fluid-conveying conveying device situated between the sorption filter and an air supply or an intake manifold of an internal combustion engine of the motor vehicle, wherein the conveying device is a bidirectional conveying device, which is switchable in a first conveying direction in the direction of the internal combustion engine for regenerating the sorption filter and in a second conveying direction in the direction of the sorption filter for carrying out a fuel tank leak diagnosis.

2. The venting system of claim 1, wherein the bidirectional conveying device includes a bidirectional pump.

3. The venting system of claim 2, wherein a fuel tank venting valve is situated between the bidirectional pump and the intake manifold.

4. The venting system of claim 2, wherein a switchover valve for supplying fresh air during the fuel tank leak diagnosis is situated between the pump and the intake manifold.

5. The venting system of claim 4, wherein the switchover valve is integrated into the bidirectional pump.

6. The venting system of claim 4, wherein the switchover valve is integrated into the fuel tank venting valve.

7. The venting system of claim 1, wherein the internal combustion engine is a turbo engine having a turbocharger unit.

8. The venting system of claim 7, wherein the pump includes a fluid-conveying connection to the intake manifold at an induction point upstream from the turbocharger unit via a first line and at an induction point downstream from a throttle valve via a second line.

9. The venting system of claim 8, wherein the first line has a first check valve, and wherein the second line has a second check valve.

10. The venting system of claim 1, wherein the sorption filter has a fluid-conveying connection to the intake manifold at a first induction point upstream from a throttle valve via a first line and at a second induction point downstream from the throttle valve via a second line, and the bidirectional conveying device is situated in the first line.

11. The venting system of claim 10, wherein the bidirectional conveying device includes a unidirectional pump which has a first switchover valve situated at the pump outlet and a second switchover valve situated at the pump inlet.

12. The venting system of claim 11, wherein the first switchover valve furthermore has a fluid-conducting connection to the sorption filter, and the second switchover valve has a fluid-conducting connection to the first line at a point downstream from the first switchover valve.

13. The venting system of claim 11, wherein a differential pressure sensor is connected between a point between a tank venting valve and the sorption filter and a point between the second switchover valve and the unidirectional pump.

14. The venting system of claim 1, wherein the first induction point is an induction point upstream from a turbocharger unit, and the second induction point is an induction point downstream from a throttle valve.

15. A motor vehicle, comprising:
   a venting system for a fuel tank of a motor vehicle, including:
      a sorption filter for temporarily storing fuel evaporating from the fuel tank; and
      a fluid-conveying conveying device situated between the sorption filter and an air supply or an intake manifold of an internal combustion engine of the motor vehicle, wherein the conveying device is a bidirectional conveying device, which is switchable in a first conveying direction in the direction of the internal combustion engine for regenerating the sorption filter and in a second conveying direction in the direction of the sorption filter for carrying out a fuel tank leak diagnosis.

16. A method for carrying out a fuel tank leak diagnosis, the method comprising:
   generating a fluid flow in a line, the line having a bidirectional conveying device having a fluid-conducting connection to a sorption filter and an air supply or an intake manifold, in a direction of the sorption filter, with the aid of the bidirectional conveying device;
   generating an overpressure with the aid of the fluid flow; and
   diagnosing a possible leak based on the overpressure.

* * * * *